Oct. 19, 1971  C. W. FEDERLINE  3,613,394
UNIVERSAL JOINT
Filed July 7, 1969  4 Sheets-Sheet 1

INVENTOR
Calvin W. Federline

BY Robert R. Priddy
ATTORNEYS

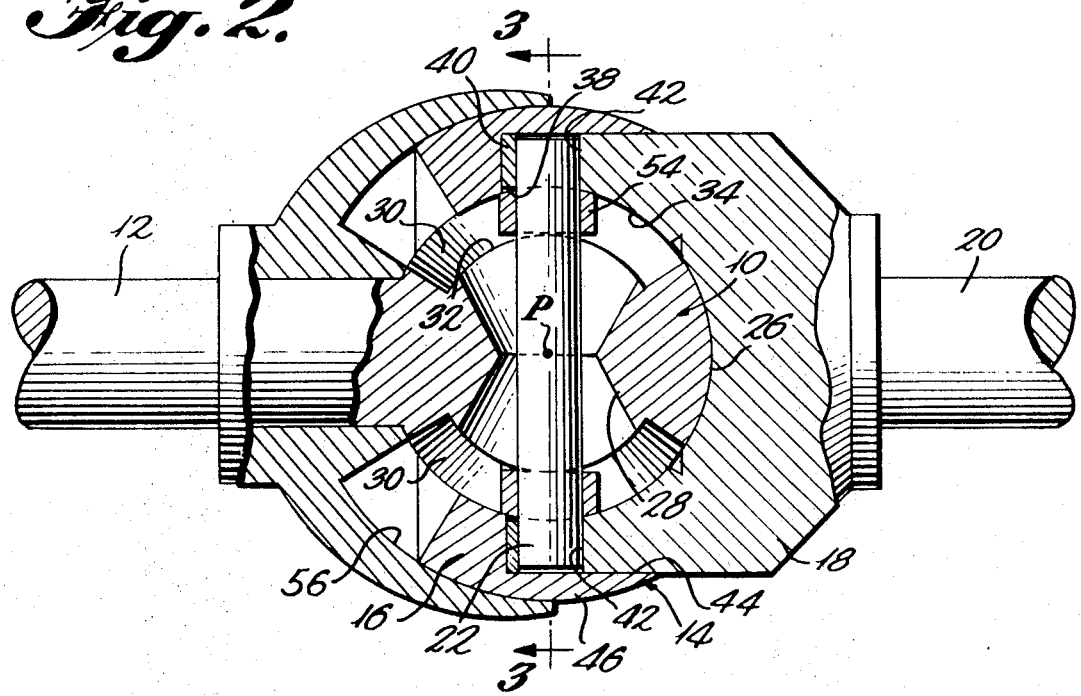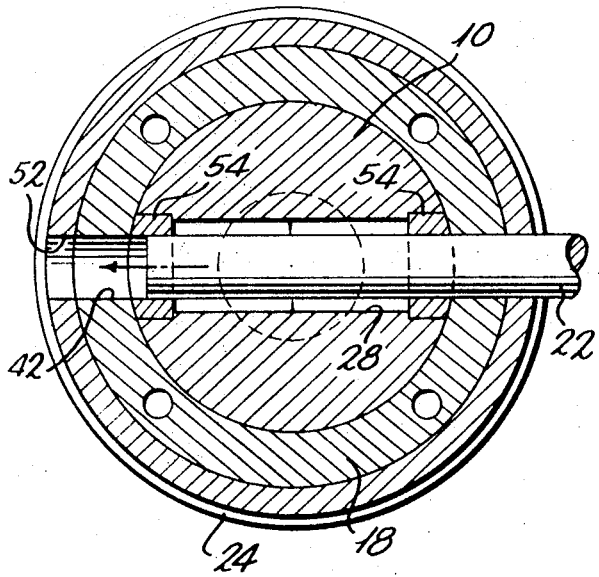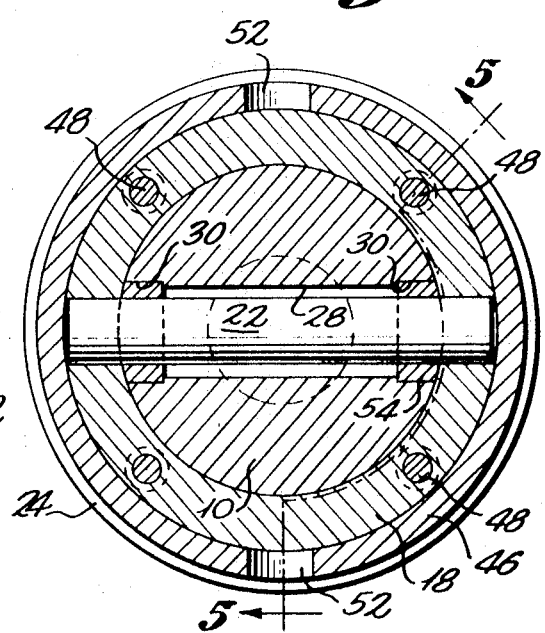

INVENTOR
CALVIN W. FEDERLINE

INVENTOR
CALVIN W. FEDERLINE

ATTORNEY

United States Patent Office 3,613,394
Patented Oct. 19, 1971

3,613,394
UNIVERSAL JOINT
Calvin W. Federline, Rte. 1, Box 170,
Thurmont, Md. 21701
Continuation-in-part of application Ser. No. 621,978, Mar.
9, 1967, now Patent No. 3,453,841, dated July 8,
1969. This application July 7, 1969, Ser. No. 839,596
The portion of the term of the patent subsequent to
Mar. 9, 1984, has been disclaimed
Int. Cl. F16d 3/16
U.S. Cl. 64—7         7 Claims

ABSTRACT OF THE DISCLOSURE

This disclosure contains a drawing and a description of a ball and socket type universal joint for transmitting torque between misaligned rotary shafts. Torque transmission between the ball and the socket of the joint is effected by a single transverse pin which is secured to the socket member and which carries bearing means slidably engaged in the ball to facilitate oscillatory movement about a transverse axis therethrough. This disclosure further illustrates and describes the manner in which the joint is assembled.

RELATED PATENT

This application discloses and claims subject matter which it has in common with the copending U.S. Pat. No. 3,453,841 of the same inventor.

BACKGROUND OF THE INVENTION

This invention relates to universal joints for transmitting torque between a pair of misaligned rotary shafts, and more particularly, it concerns universal joints of the type including a ball and socket assembly together with a radial or transverse pin for transmitting torque between the respective ball and socket members of the assembly.

Ball and socket joints of the general type to which the present invention relates are quite commonly disclosed in prior publications and patents. They are particularly desirable from the standpoint of providing a reasonably compact torque transmitting universal joint. However, in past designs of ball and socket universal joints, both machining costs and assembly costs have made them non-competitive with other designs which are less desirable from a safety standpoint. Moreover, the task of retaining the compactness and simplicity of such joints while improving their performance under high torque and/or high speed operating conditions has proven difficult.

In an early (1904) example of a ball and socket type joint shown in Bullard's U.S. Pat. 771,457, bearing blocks carried on the exterior surface of the ball engage bearing surfaces mounted in hollowed out portions of the socket. The size of the hollowed out portions and the effect of strength requirements on the thickness of those portions of the socket which surround both the hollowed out portions and the ball-shaft opening increase the bulk and weight of the joint, while reducing its flex angle.

In a more recent (1951) example of the prior art, Browning's U.S. Pat. 2,546,298, the use of bearing blocks has been abandoned in favor of a pair of tapered rollers rotatably mounted on a common coupling pin. The pin ends are secured in seats in the socket, and the rollers engage and roll upon beveled bearing tracks formed in a slot within the ball, through which the pin passes. In such a joint, the tapered rollers, which engage the bearing tracks make two complete reversals in their direction of rotation for each complete rotation of the joint, with the frictional forces of such reversals, and the pressure exerted on the bearing surfaces being concentrated at small interfaces between the curved surfaces of the rollers and the bearing tracks.

The performance of these joints has heretofore caused those skilled in the art to doubt the usefulness of ball and socket universals for high torque, high speed applications. The present invention is aimed at improving various aspects of ball and socket universal joints, including improving their simplicity of construction and assembly, their torque and speed handling capabilities and their wearing properties, and various other objects which will be rendered apparent hereinafter.

SUMMARY OF THE INVENTION

In accordance with the present invention, an improved ball and socket type universal joint is provided in which a slotted ball member, adapted to be connected to one shaft, is received within a socket member, adapted to be connected to another shaft from or to which torque is transmitted. The socket member has a pair of aligned diametric bores for receiving a pin extending through the slotted ball and in a sliding engagement therewith by way of bearing blocks on the pin slidable on bearing ways formed in the ball member.

In accordance with a first particular aspect of the present invention claimed in the above-mentioned related patent, the socket member is formed of two parts, one part of which is adapted to be connected to a shaft and has the above-mentioned diametric bores formed therein. The other part of the socket member has a skirt portion that telescopes over the shaft connected part and is adjustable rotatably with respect thereto so that a pair of diametric apertures in the skirt portion may be aligned with the diametric bores in the shaft connected part to facilitate insertion of the pin and then fixed in a non-aligned position to retain the pin in its operative position.

In accordance with a second particular aspect of the present invention, the bearing ways formed in the ball and the surfaces of the bearing blocks which engage them are both planar, to provide sliding rather than rolling contact during rotation of the joint, with the bearing blocks being maintained within the slot in the ball by contact with the internal surface of the socket member.

The above-mentioned related patent claims one specie of the second aspect of the invention in which the bearing blocks are spaced apart from one another on the pin member and are maintained in place by shoulders at the bottoms of counter slots formed in the ball, and by contact between spherical outer surfaces on the bearing blocks which conform to a mating spherical surface in the socket member. In this specie the planar bearing ways comprise parallel portions of the opposed walls of the counter slots, against which the planar sides of the bearing blocks are engaged in sliding contact.

The present specification discloses and claims for the first time a second specie of the second aspect of the invention. In this specie of the invention, the bearing ways are parallel planar opposing interior surfaces of the transverse slot-like aperture of the ball, which planar surfaces extend through the axis about which the pin oscillates in the aperture.

In its preferred form, the last-mentioned specie of the invention has substantially no spacing between bearing blocks. Thus, there may be only a single bearing block contacting said planar surfaces on radially opposed sides of the aforementioned axis of oscillation. The single bearing block may be formed of a single piece of material or formed of several pieces of material which have been secured to one another. There may also be two or more bearing blocks which have not been secured to one another, but which contact or are at least closely adjacent both to one another within the slots and to the spherical internal walls of the socket at the diametrically opposed ends of the slot.

In a particularly preferred form of the last-mentioned specie of the invention, the bearing block(s) is(are) of smooth surfaced solid synthetic resinous material, of which many examples are known, e.g.: polycarbonates; polyhaloethylenes, such as polytetrafluoroethylene; polyalkenes, such as polyethylene and polypropylene; polyvinylhalides, such as polyvinylchloride; and nylon, which is preferred. The synthetic resinous bearing block(s) is(are) generally used in contact with metallic, e.g. case hardened or resulfurized steel, bearing ways.

BRIEF DESCRIPTION OF THE DRAWINGS

FIG. 3 is a cross-section taken on line 3—3 of FIG. 2;

FIG. 4 is a cross-section similar to FIG. 3 but depicting the parts of the joint during assembly;

FIG. 5 is a cross-section taken on line 5—5 of FIG. 3;

DESCRIPTION OF THE FIRST EMBODIMENT

Figure 1:
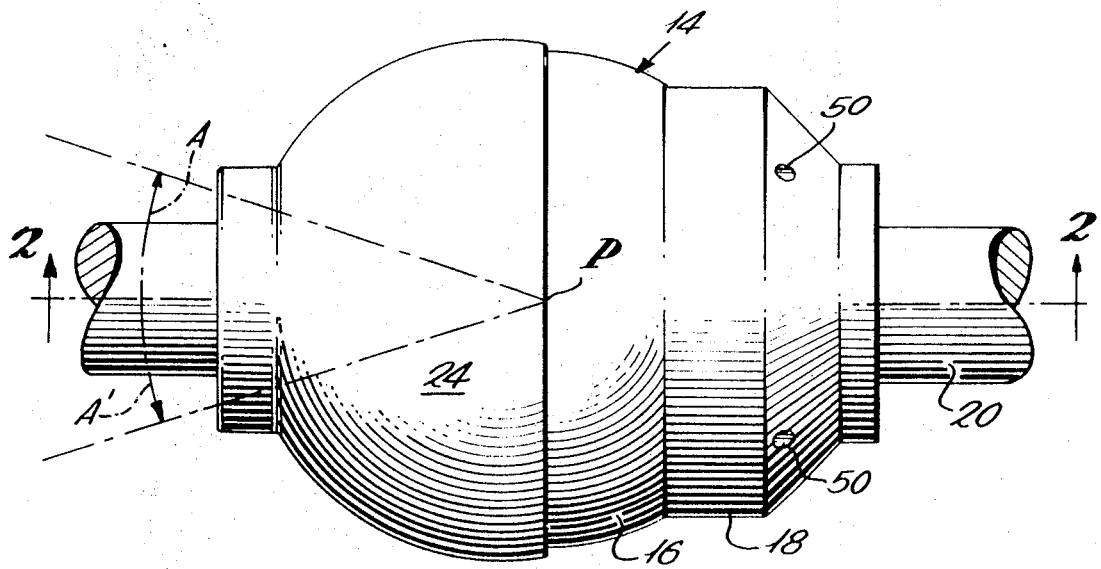
FIG. 1 is a plan view showing the exterior of a first embodiment of the universal joint in accordance with this invention.

As shown in the drawings, the universal joint of this embodiment includes generally, a ball member 10 secured on the end of a rotatable shaft 12; a two-part socket member 14 having a spherical part 16 and a cylindrical part 18 fixed on a second shaft 20; a radial or transverse pin member 22 for transmitting torque between the ball member 10 and the socket member 14; and a guard member 24. In the embodiment shown, the universal joint is designed to transmit torque between the shafts 12 and 20 when the angle of intersection made by the axes of the respective shafts about a point P falls within the angles A or A¹ as shown in FIG. 1. The manner in which the respective parts mentioned above cooperate to achieve this result, as well as the manner in which they are assembled, is described in more detail below.

The ball 10 may be formed from an enlarged integral portion of the shaft 12 or more preferably, from a piece of metal welded or brazed thereon, and includes an outer convex spherical surface 26 concentric with the point of shaft intersection P. An outwardly diverging diametric slot 28 is formed in the ball member. The slot 28 opens into a pair of diametrically opposed counter slots 30, which in turn, extend radially between the spherical surface 26 and an arcuate ledge or shoulder 32.

The ball 10 is slidably received in an undercut concave spherical surface formed in part by spherical surface portion 34 on the cylindrical socket member part 18 and in part by a spherical surface portion 36 in the spherical socket member part 16. The undercut concave spherical portion in the socket member 14 serves to secure the ball within the socket member 14 in the assembled joint.

Figure 2:
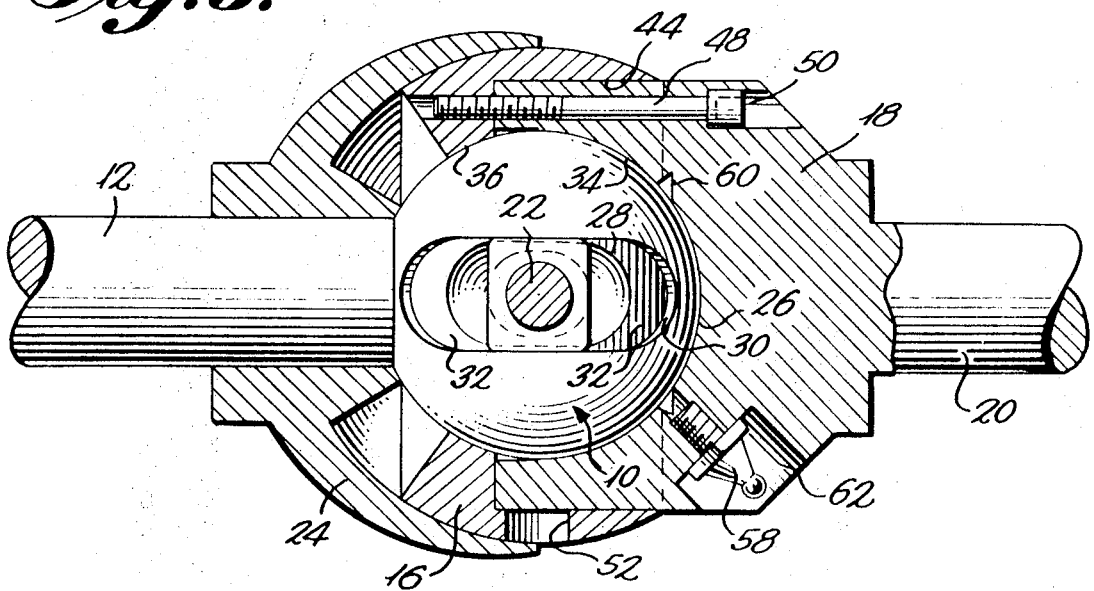
FIG. 2 is a cross-section taken on line 2—2 of FIG. 1.

The cylindrical part 18 is provided with an inner cylindrical surface 38 of a diameter equal to or greater than a great circle diameter of the spherical surface 34 to establish an annular part 40 having a pair of diametrically opposed circular bores 42 therein to receive the ends of the pin 22. The pin 22 is circular in cross-section and of a diameter to provide a close fit in the bores 42. Also, it will be noted that the pin is of a length slightly less than the external diameter of the cylindrical part 18 so that in the assembled joint, the pin lies within the outer circumference of the member 18 as shown in FIGS. 2 and 3 of the drawings.

The spherical socket part 16 is provided with a large cylindrical counter bore 44 to establish an annular skirt portion receivable in telescopic fashion over the cylindrical part 18. As shown in FIGS. 3 and 5 of the drawings, the parts 16 and 18 forming the socket member 1 are secured to one another by four Allen head screws 48 disposed on 90 degree centers, the heads of the screws 48 being received in counter sinks 50. Also it will be noted that the skirt 46 is provided with a pair of diametrically opposed bores 52 as shown in FIGS. 3 and 4 of the drawings for purposes of assembly to be described in more detail below.

It will be apparent to those skilled in the art, that in order for torque to be transmitted between the ball 10 and the socket member 14 by the pin 22, the pin must accommodate pivotal movement about two mutually perpendicular axes. One of these axes is established by the axis of the pin itself and to this end, the ends of the pin may be rotatably journaled in the bores 42 of the cylindrical socket member part 18. The other of the axes referred to is an axis passing transversely through the pin and the point of shaft intersection P. To facilitate this pivotal movement about the latter axis, the pin passes through a pair of bearing blocks 54 in the form of centrally bored rectangular or square members having a depth substantially the same as that of the counter slots 30. The outer surface of the bearing blocks may be spherically shaped to conform with the mating spherical surfaces on the ball 10 and the socket member 14. It will be noted further from FIGS. 3 and 4 of the drawings, that the width of the slot 28 in the ball is substantially greater than the diameter of the pin 22 so that no contact is made between the central portion of the pin and the walls of the slot 28. Instead, torque transmitting bearing contact is made only between sides of the bearing blocks 54 and the side walls of the counter slots 30. Because the bearing blocks are maintained at the outer edge of the ball 10 by the shoulders 32 at the bottom of the counter slots 30, the bearing loads exerted by the blocks 54 against the side walls of the counter slot 30 are kept at a minimum for given torque loads.

The operation of the joint to transmit torque between the shafts 12 and 20 of the embodiment shown, where the shafts are misaligned, is conventional in the sense that rotation of one shaft to drive the other results in a corresponding movement of the socket member and ball member relative to the pin, causing the pin to oscillate about a transverse axis through the point of intersection P causing the bearing blocks 54 to slide back and forth in the counter slots 30. Simultaneously, the pin 22 rotates on its own axis relative to either the bearing blocks 54, or the bores 42 in the socket member part 18, or both.

To facilitate trouble-free operation of this type, the guard member 24 is provided with an interior spherical surface 56 to make sliding engagement with the outer surface of the spherical socket member part 16. This arrangement not only prevents foreign material such as dust and the like from fouling operation of the moving parts of the joint, but also it provides a measure of safety by contributing to a completely smooth external surface on the joint.

As shown in FIG. 5, the joint may be lubricated with grease or like lubricant introduced through a conventional grease nipple 58 in communication with a circular groove 60 formed in the spherical surface 34 on the interior of the cylindrical part 18. It will be noted that the grease nipple is located entirely within a counter bore 62 in a manner similar to the bolts 48 so that it does not project from the outer peripheral or circumferential surfaces of the joint.

Assembly of the joint disclosed is accomplished by first placing the socket member part 16 over the ball 10 and then placing the guard member 24 over these parts. The manner in which the guard member is secured in place may vary with the circumstances under which the universal joint is used. For example, in situations where only partial disassembly of the joint is required, the guard member may be welded or brazed in place on the shaft 12. In other situations, it may be desired to thread the guard member on the shaft 12 so that it may be readily removed and also to facilitate removal of the socket member part 16.

After the assembly of the socket member part 16 and guard member 24 over the ball member 10, the bearing blocks 54 are placed into the counter slots 30 and the cylindrical part 18 advanced into the large counter bore 44 in the spherical part 16. It is then rotated until the bores 52 in the skirt 46 align with the bores 42 in the annular portion 40 of the cylindrical part 18. The disposal of the holes in which the bolts 48 are received on 90 degree-centers facilitates this orientation since alignment of the holes in the member 18 with the bolt holes in the member 16 at an angle of 90 degrees with respect to their ultimate position will retain the holes 52 aligned with the bores 42. Using a drift pin or other siimlar tool to align the bearing blocks 54 with the bores 42 and 52, the pin 22 may be advanced through the respectively aligned bores in these members. When the pin has been fully advanced, the member 18 is rotated 90 degrees with respect to the member 16, once more bring the holes for the screw bolts 48 into alignment. The parts are then secured by placing and tightening the bolts 48. Because the holes 52 are 90 degrees out of alignment with the bores 42 as shown in FIG. 3 of the drawings, the pin 22 is retained in place by the skirt 46. To disassemble the joint, it will be appreciated that aforementioned procedure will be reversed.

DESCRIPTION OF THE SECOND EMBODIMENT

Figure 6:
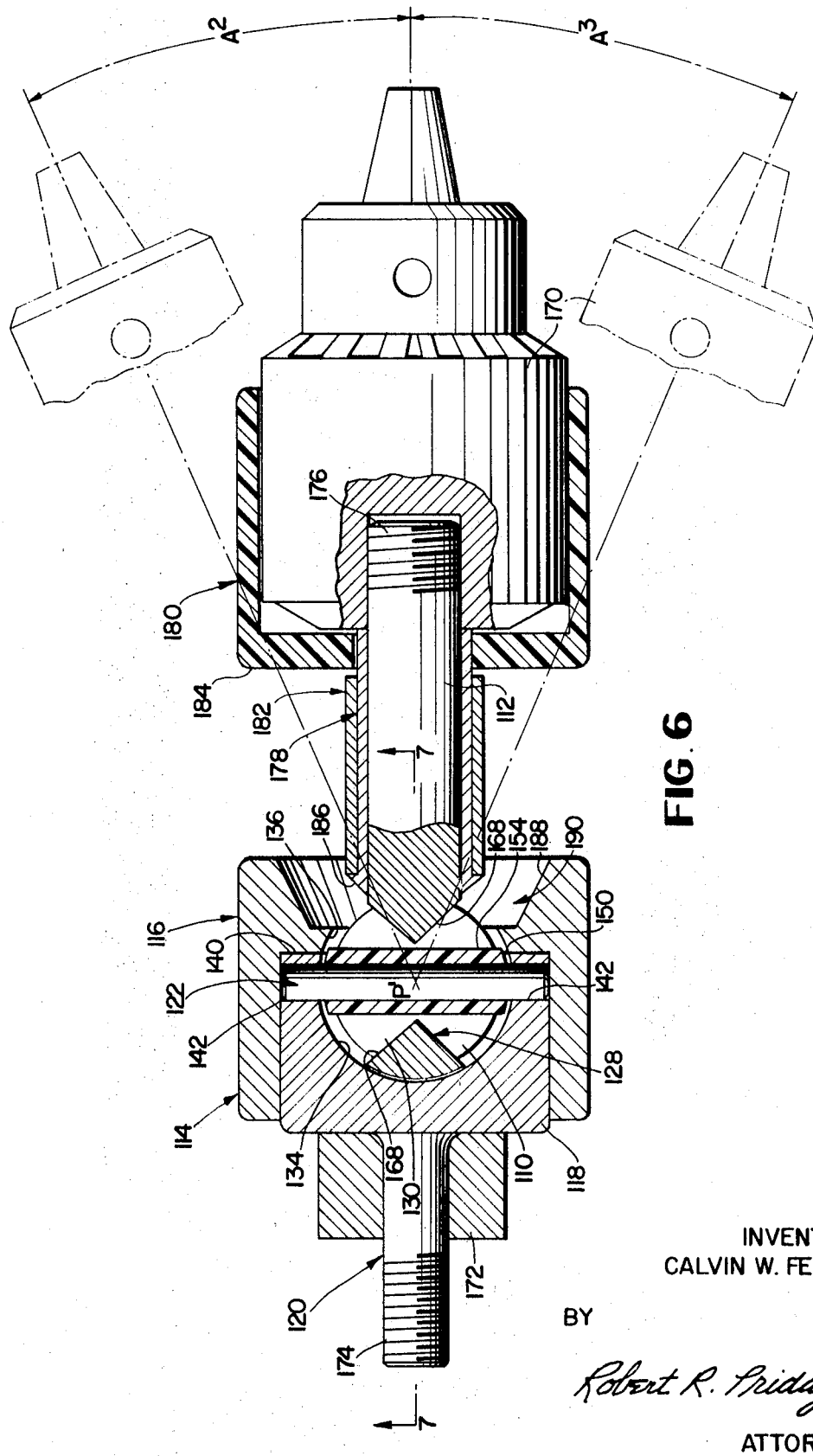
FIG. 6 is a partial longitudinal sectional view of a second embodiment of the invention.
Figure 7:
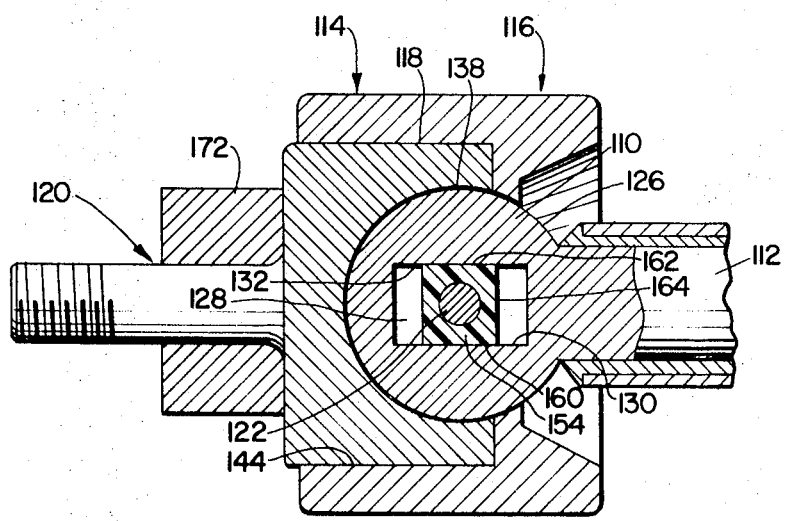
FIG. 7 is a cross-section taken on line 7—7 of FIG. 6.

The presently preferred second embodiment of the invention is shown in FIGS. 6 and 7, and it is very well adapted for such applications as transmitting torque between hand-held electric drills and drill chucks. As shown in the drawings, the universal joint of this embodiment includes generally, a ball member 110 secured on the end of a rotatable shaft 112; a two-part socket member 114 having an outer part 116 and an inner part 118 fixed on a second shaft 120; and a radial or transverse pin member 122 for transmitting torque between the ball member 110 and the socket member 114. In the embodiment shown, the universal joint is designed to transmit torque between the shafts 112 and 120 when the angle of intersection made by the axes of the respective shafts about a point P' falls within the angles $A^2$ or $A^3$ as shown in FIG. 6. The manner in which the respective parts mentioned above cooperate to achieve this result, as well as the manner in which they are assembled, is described in more detail below.

The ball 110 may be formed from an enlarged integral portion of the shaft 112, and includes an outer convex spherical surface 126 concentric with the point of shaft intersection P'. An outwardly diverging diametric slot 128 is formed in the ball member. The slot 128 is defined in part by opposing, spaced apart planar interior surfaces 130 and 132 which extend through the axis about which pin 122 oscillates, which axis passes through point P' in FIG. 6.

The ball 110 is slidably received in an undercut concave spherical surface formed in part by spherical surface portion 134 on the inner socket member part 118 and in part by a spherical surface portion 136 in the spherical socket member part 116. The undercut concave spherical portion in the socket member 114 serves to secure the ball within the socket member 114 in the assemble joint.

The socket part 118 is provided with an inner cylindrical surface 138 of a diameter equal to or greater than a great circle diameter of the spherical surface 134 to establish an annular part 140 having a pair of diametrically opposed circular bores 142 therein to receive the ends of the pin 122. The pin 122 is circular in cross-section and of a diameter to provide a tight fit in the bores 142. Also, it will be noted that the pin is of a length slightly less than the external diameter of the socket part 118 so that in the assembled joint, the pin lies within the outer circumference of the member 118 as shown in FIG. 6 of the drawings.

The outer socket part 116 is provided with a large cylindrical counter bore 144 to establish an annular skirt portion receivable in telescopic fashion over the inner socket part 118. As shown in FIGS. 6 and 7 of the drawings, the parts 116 and 118 forming the socket member 114 are secured to one another by a press fit.

It will be appreciated by those skilled in the art, that in order for torque to be transmitted between the ball 110 and the socket member 114 by the pin 122, the pin must accommodate pivotal movement about two mutually perpendicular axes. One of these axes is established by the longitudinal axis of the pin itself. The other of the axes referred to is the axis of oscillation passing transversely through the pin and the point of shaft intersection P'. To facilitate pivotal movement about these axes, the pin carries a single rotatable nylon bearing block 154 in the form of an elongated centrally bored member which extends on radially opposed sides of the axis of oscillation P'.

In the preferred form shown herein, bearing block 154 has a length which is about equal to the diameter of the ball 110, so that its spherical ends 150 are closely adjacent to the spherical inner surface 134 of socket 114. Its shape is defined in part by parallel planar bearing surfaces 160 and 162 spaced apart by the same distance as bearing ways 130 and 132, respectively, and is in sliding contact therewith.

In the most preferred form of the joint, the bearing block 154 also has parallel planar sides 164 which are perpendicular to bearing ways 130 and 132, as are the outwardly tapering side walls 168 of slot 128. The sides 164 may be pinched or relieved near the center adjacent the narrowest portion of the slot 128 to prevent air lock difficulties in high speed operation.

When the joint is used to transmit power between an electric drill and a misaligned chuck 170, the shaft 120 is provided with a thrust collar 172 and is secured by threads 174, plus an adapter, if necessary, to the drive shaft of the drill. The chuck 170 is secured by threads 176 to shaft 112. The chuck abuts against the end of cylindrical sleeve 178 which maintains the spacing between the chuck and ball 110, and is mounted coaxially on shaft 112.

To facilitate hand-holding the chuck, a synthetic resinous, e.g. nylon shroud 180 is rotatably mounted in telecoped, coaxial relationship with the chuck on sleeve 178. A second cylindrical sleeve member 182 mounted in coaxial telescoping relationship surrounding sleeve 178, and which abuts the rear wall 184 of shroud 180 and a peripheral stop flange 186 on sleeve 178, provides spacing between the ball 110 and the shroud. Because sleeve 182 is rotatable relative to shaft 112, whenever it comes in contact with the conical outwardly divergent wall 188 of shaft opening 190 it functions as a bearing to reduce friction between shaft 112 and socket 114.

Thus it will be appreciated that by this invention an improved ball and socket type universal joint is provided by which the above-mentioned objectives are completely fulfilled. Not only does the present invention possess the many advantages enumerated above, but also it provides an exceptionally smooth-running coupling for shafts disposed at greater angles and operating at higher speeds than incurred in conventional universal joint applications. Moreover, tests of the joint indicate an extremely small velocity variation between input and output shafts coupled by the joint. Hence the universal joint of this invention operates at higher speeds and at wider shaft-angles while yielding less velocity variation than universal joints most widely used at present. Further, this joint transmits torque with less operational friction and with correspondingly greater efficiency than joints heretofore available.

What is claimed is:

1. A universal joint for transmitting torque between a pair of non-aligned shafts, said joint comprising: an inner ball member for connection to one of the shafts and having a transverse slot like aperture formed therein; an outer socket member fitted for universal pivotal movement on said ball member and adapted for connection to the other of said shafts, said socket member having a pair of diametrically aligned circular bores formed therein; a pin member extending through said slot-like aperture, the end portions of said pin member being fitted in said bores; bearing block means rotatable on said pin and disposed within said slot-like aperture within said ball and having spaced apart parallel bearing surfaces which slidably engage corresponding spaced apart parallel planar bearing ways which in part define the interior surface of said slot-like aperture, whereby said bearing block means is adapted for oscillation on said pin as said joint rotates.

2. The universal joint of claim 1 where in said bearing ways each extend as planar surfaces throughout said slot.

3. The universal joint of claim 1 having bearing block means of square cross section.

4. The universal joint of claim 1 having bearing block means of about the same overall length as the diameter of said ball.

5. The universal joint of claim 1 wherein the bearing block means is a single bearing block.

6. The universal joint of claim 1 having bearing block means including surfaces of synthetic resinous material.

7. The universal joint of claim 1 having bearing block means of nylon.

References Cited
UNITED STATES PATENTS

| | | | |
|---|---|---|---|
| 1,225,524 | 5/1917 | Swartz | 64—7 |
| 3,453,841 | 7/1969 | Federline | 64—7 |

MARK M. NEWMAN, Primary Examiner

R. HEALD, Assistant Examiner